United States Patent [19]
Biricik et al.

[11] Patent Number: 4,939,043
[45] Date of Patent: Jul. 3, 1990

[54] OPTICALLY TRANSPARENT ELECTRICALLY CONDUCTIVE SEMICONDUCTOR WINDOWS

[75] Inventors: V. Warren Biricik, Palos Verdes Estates; James M. Rowe, Torrance; Paul Kraatz, Redondo Beach; John W. Tully, Rolling Hills Estates, all of Calif.

[73] Assignee: Northrop Corporation, Los Angeles, Calif.

[21] Appl. No.: 258,239

[22] Filed: Oct. 14, 1988

Related U.S. Application Data

[63] Continuation-in-part of Ser. No. 14,326, Feb. 13, 1987, Pat. No. 4,778,731.

[51] Int. Cl.$^5$ .............................................. B21D 39/00
[52] U.S. Cl. .................................... 428/620; 428/639; 428/641; 428/336; 428/698; 148/33.1; 148/33.4; 252/62.3 ZT
[58] Field of Search ............... 428/623, 620, 639, 641, 428/336, 689, 698; 148/33.1, 33.4; 252/62.3 ZT

[56] References Cited

U.S. PATENT DOCUMENTS 4,035,819  7/1977  Nitta et al. ........................... 428/698
4,704,339  11/1987  Green et al. ......................... 428/689
4,778,731  10/1988  Kraatz et al. ....................... 428/623

FOREIGN PATENT DOCUMENTS 204562  12/1986  European Pat. Off. .
80918   4/1987   Japan .................................. 428/689

OTHER PUBLICATIONS

Aranovich et al., "High Conductivity ZnSe Films," *J. Applied Physics*, 49(4), Apr. 1978, pp. 2584–2585.

*Primary Examiner*—Upendra Roy
*Assistant Examiner*—George Wyszomierski
*Attorney, Agent, or Firm*—Terry J. Anderson; Robert B. Block

[57] ABSTRACT

A semiconductor window which is transparent to light in the infrared range and which has good electrical conductivity is formed of a substrate material having a semiconductor coating having a dopant included therein. The coating is diffused, grown or deposited on one surface of the substrate and is controlled to obtain both low electrical resistivity and high infrared transmissivity. The coating can be formed of the same material as the substrate or can be a different material. Windows having particular thermal properties are formed utilizing zinc selenide and zinc sulfide as the substrate.

11 Claims, 4 Drawing Sheets

OPTICALLY TRANSPARENT ELECTRICALLY CONDUCTIVE SEMICONDUCTOR WINDOWS

CROSS REFERENCE TO RELATED APPLICATIONS

This application is filed as a continuation-in-part of an application entitled OPTICALLY TRANSPARENT ELECTRICALLY CONDUCTIVE SEMICONDUCTOR WINDOWS AND METHODS OF MANUFACTURE, Ser. No. 014,326, filed in the name of Paul Kraatz, James M. Rowe, John W. Tully, Vahram W. Biricik, Wesley J. Thompson and Rudolph W. Modster on Feb. 13, 1987, the entire contents of which are herein incorporated by reference, and which is now U.S. Pat. No. 4,778,731.

BACKGROUND OF INVENTION

This invention relates to windows having an infrared transparent substrate and a transparent electrically conductive semiconductor.

Transparent conductive windows through which optical energy must pass and which have good electrical conductivity have utility in a number of applications. These include resistance heated windows, electromagnetic interference (EMI) shielded windows, antistatic windows and transparent electrodes. In U.S. Pat. No. 4,710,433, entitled TRANSPARENT CONDUCTIVE WINDOWS, COATINGS, AND METHOD OF MANUFACTURE and assigned to Northrop Corporation, the assignee of the present application, transparent conductive windows, coatings and their method of manufacture are described which employ thin conductive metal layers which are sandwiched between dielectric impedance matching layers. The devices of this prior patent afford both good electrical conductivity and transmissivity in the infrared and ultra violet ranges.

Other known applicable prior art devices are discussed by J. L. Vossen in an article on transparent conducting films which appeared in *Physics of Thin Films*, Volume 9, published in 1977 by Academic Press. In this article, the use of semiconductor oxides forming transparent conductive films is discussed. It has been found, however, that semiconductor oxide substrates exhibit the shortcomings of low carrier lifetime, resistivity which is higher than to be desired and relatively low optical transmissivity particularly in the infrared range.

Further J. Aranovich, et. al., in "High conductivity ZnSe Films", *J. Appl. Phys.*, 49(4), April 1978; L. C. Olsen, et. al., in "Vacuum-evaporated Conducting ZnS Films", *Appl. Phys. Lett.*, 34(8), April 1979; P. Petrou, et. al., in "The Use Of ZnO In Transparent Type MIS Solar Cells", *Appl. Phys. Lett.*, 15 December 1979; J. B. Webb, et. al., in "Transparent And Highly Conductive Films Of ZnO Prepared By rf Reactive Magnetron Sputtering", *Appl Phys. Lett.*, 15 October 1981 and H. Nanto, et. al., in "Electrical And Optical Properties Of Zinc Oxide Thin Films Prepared By rf Magnetron Sputtering For Transparent Electrode Applications", *J. Appl. Phys.*, 55(4), 15 February 1984 have studied the feasibility of depositing thin conducting films of ZnS, ZnSe or ZnO films for potential use in photovoltaic heterojuctions for solar cells. For these demonstrations, with one exception, the films were deposited on glass slides. For the demonstration of P. Petrou et. al. a titanium film was interspersed between the thin film and the glass slide.

The device of the present invention affords a number of advantages over that of the aforementioned prior devices and demonstrations. These include the capability of providing transmissivity over greater band widths; higher transmissivity for electromagnetic waves having angles of incidence away from the normal; greater mechanical durability; increased device size and greater ease and economy of fabrication.

DISCLOSURE OF THE INVENTION

It is a general object of the present invention to provide windows having transparent, conductive semiconductor coatings. It is an object of this invention to provide windows having high optical transmittance throughout a broad optical band and low sheet resistance. It is a further object of this invention to provide windows which maintain their transparency at high temperatures.

The present invention provides for transparent conducting windows including infrared conducting windows which include an infrared transparent substrate having a semiconductor coating on a surface thereof. The semiconductor coating includes a dopant for rendering the coating conductive. The substrate and the semiconductor coating may be of the same material or they may be different materials.

Devices of the invention include window substrates including zinc selenide, zinc sulfide, sapphire, spinel and aluminum oxy nitride.

Devices of the invention include semiconductor coatings including gallium arsenide, gallium aluminum arsenide, silicon, germanium, zinc sulfide, zinc selenide, zinc oxide, semiconducting diamond and semiconducting silicon carbide.

For use with germanium or silicon coating, dopants include lithium, phorphorus, arsenic, antimony, bismuth, boron, aluminum, gallium, indium, zinc and thallium.

For use with gallium arsenide or gallium aluminum arsenide coatings, dopants include sulfur, selenium, tin, tellurium, germanium, silicon, magnesium, lithium, zinc, manganese, cadmium and beryllium.

For use with zinc sulfide, zinc selenide or zinc oxide coatings, dopants include zinc, aluminum, gallium and indium.

For use with semiconducting diamond and semiconducting silicon carbide since these are of the same period as are silicon and germanium, silicon and germanium type dopants are selected.

In an embodiment of the invention employing either a semiconductor or a non-semiconductor substrate, a semiconductor coating and a dopant are deposited on a surface of the substrate. As such the substrate and the coating can be the same material or a different material. In view of this the substrate can be selected with respect to a first set of parameters and the coating with respect to a second set of parameters which (aside from the coating being conductive and the substrate non-conductive) may be identical, similar to or complementary to those of the first set of parameters.

BRIEF DESCRIPTION OF THE DRAWINGS

This invention will be better understood when taken in conjunction with the drawings wherein.

MODES OF CARRYING OUT THE INVENTION

Figure 1:
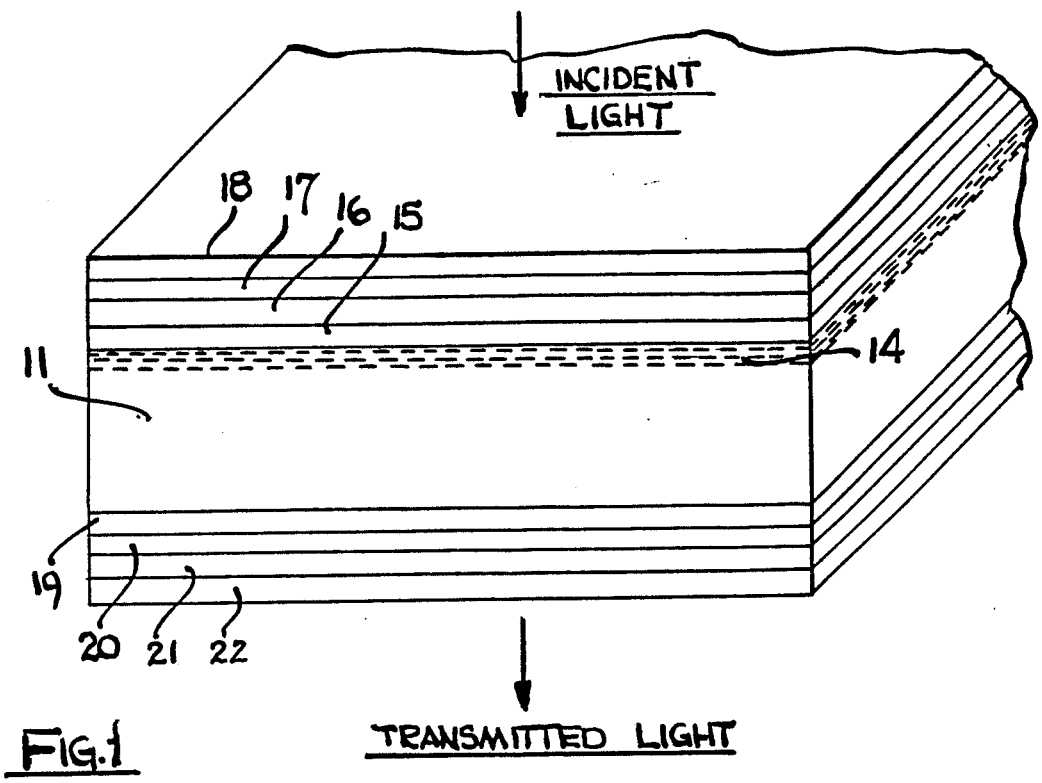
FIG. 1 is a schematic drawing illustrating the structure of a window of the invention.

As used herein, the term "doped" means establishing an impurity concentration in a semiconductor by diffusion, epitaxial deposition, or other means.

The windows of the invention have a substrate which is transparent to infrared radiation. A coating is then formed in or on the substrate. Thus the coating is either an inherent layer of the transparent substrate or an added transparent layer. In any event the coating is doped with an appropriate dopant to render the coating conductive but still maintain it transparent. Generally the coating will be of a thickness of from 1 to about 200 microns thick. Typically of a thickness of from 1 to 50 microns.

For coatings which are formed as inherent layers of the substrate, the substrate is chosen as a semiconductor material and a dopant is diffused or otherwise located in a surface layer of the substrate. The dopant is typically diffused to a thickness of from 15 to 50 microns.

For a coating formed as a layer added to the substrate, as with the diffusion process, the substrate can be a semiconductor. Additionally for an added layer, the substrate can be selected for properties other than its being a semiconductor as, for example, for its mechanical properties. An added coating will have a thickness of up to 200 microns, typically from about 2 to about 25 microns.

Irrespective of construction of the windows of the invention, the substrates utilized for the windows of the invention will be transparent to infrared radiation. Depending on the particular substrate and coating selected, windows of the invention will include transparency up to about 16 microns as, for instance, in a range of from about 2 microns to about 16 microns. Thus windows of the inventions include infrared transparency from near to long IR (infrared).

While certain of the materials for the substrates and coatings of the windows of the invention are very broad band, i.e. gallium arsenide, zinc sulfide and zinc selenide, other substrates and coatings have a more limited frequency range and will be chosen for that frequency range. The conductive coated windows of the invention thus have particular useful properties in the infrared wave lengths, those most useful being the 3 to 5 micron and the 8 to 12 micron ranges.

Aside from being transparent in the wavelengths of interest, in selecting the substrates for the windows of the inventions, consideration may also include other criteria including but not limited to mechanical properties and availability of certain window sizes. Mechanical properties which may be considered are the mechanical strength and thermal working ranges of the substrates.

While the semiconductor materials utilized for the coatings of the present invention typically have higher resistivity than metallic coatings, because they have greater optical transparency they can be utilized as thicker coatings and as such the final coating will have a sheet resistance equal to or lower than the sheet resistance for a similar metal coating but will also enjoy a greater optical transparency. Further, semiconductor coatings better match the mechanical properties of the window substrate and, as such, better index of refraction matching is possible between the semiconductor coatings versus metal coatings. As opposed to prior metal conductive layers which were only Angstroms thick, the conductive semiconductor coatings of the invention are deposited in the above noted thicknesses of from about 1 micron to about 200 microns and at these thickness exhibited conductivities below about 100 ohms per square or preferably lower as, for instance, below 30 ohms per square and for certain preferred uses below 10 ohms per square.

Generally materials for the coatings will be selected to take advantage of both their electrical conductivity and their transparency to the wavelengths of interest. Normally the cut off point with respect to the lower end of the range of wavelengths for the coatings is governed by the band gap whereas the cut off for the longwave length is governed by the conductivity. As such, depending upon the particular window which is of interest, these factors will be taken into consideration for choosing both an appropriate coating and an appropriate substrate suitable for the particular window of interest.

In preparing windows of the invention by diffusing a dopant into a substrate, the dopant is diffused to greater depths than are commonly employed in other technologies and its concentration, distribution and depth of diffusion are closely controlled to effect optimum optical transmittance and low electrical resistivity. In a window of the invention employing a semiconductor material for the substrate, coatings formed by doping the substrates with appropriate dopant elements which diffuse into the substrate surface, are formed so as to leave the optical constants of the substrate essentially unchanged.

The dopant may be applied to the substrate surface by a variety of means depending upon the chemistry of the substrate and dopant and their responses to various ambient environmental conditions. The dopant may be deposited on the substrate surface from an inert gas carrier in a controlled atmosphere in a furnace, for example. It may be deposited on the substrate surface from a liquid solution, suspension, or slurry, by spinning or spraying, and preconditioned by thermal treatment in a controlled atmosphere. It may be deposited in vacuum by various means, including evaporation from an electron beam or thermal source, sputtering in dc, rf, or magnetron-supported discharge, or combinations thereof, ion beam sputtering, ion plating, molecular beam epitaxy, or variants thereof, and ion implantation. It may also be deposited on the substrate surface by reactants in the vapor phase (i.e., chemical vapor deposition) at, above, or below atmospheric pressure. However applied, the dopant is diffused into the surface of the substrate. Diffusion is effected at an appropriate temperature considering the substrate and the dopant as, for example, at elevated temperature (600–1200° C.).

For maximizing transmittance, a series of dielectric anti-reflection stacks are deposited on both of the opposite surfaces of the substrate.

In preparing windows of the invention by depositing a doped coating onto a surface of a substrate, the doped coating can be deposited utilizing a variety of homoepitaxy or heteroepitaxy procedures. Examples of homoepitaxy include, but are not limited to, doped silicon on silicon, doped germanium on germanium, doped gallium arsenide on gallium arsenide, doped zinc sulfide on zinc sulfide and doped zinc selenide on zinc selenide; i.e., the deposited layer is, in essence, chemically identical to the substrate host, with the addition of a trace amount of a dopant species. Examples of heteroepitaxy include, but are not limited to, gallium arsenide on germanium, gallium aluminum arsenide on gallium arsenide, and germanium on zinc sulfide or zinc selenide; i.e., the deposited layer is chemically different, but structurally similar to the substrate host, on an atomic scale. In addition, similarities in chemical bond type and coefficient of thermal expansion between substrate host and deposited layer are considered for the occurrence of heteroepitaxy. To augment the properties of these windows, a series or "stack" of dielectric antireflection coatings might then also be deposited on the coated and uncoated surfaces of the substrates employed.

Coatings are deposited onto a substrate by various means including vacuum evaporation, sputtering, and various chemical vapor deposition such as plasma assisted chemical vapor deposition, microwave plasma assisted chemical vapor deposition, photon assisted chemical vapor deposition, halide chemical vapor deposition, metal organic chemical vapor deposition and remote plasma enhanced chemical vapor depositions.

In taking into account the above teachings, useful for substrates for the windows of the invention are silicon, germanium, gallium arsenide, zinc selenide, zinc sulfide, sapphire, spinel and aluminum oxy nitride. Useful for the semiconductor coatings are gallium arsenide, gallium aluminum arsenide, silicon, germanium, zinc sulfide, zinc selenide, zinc oxide, semiconducting diamond and semiconducting silicon carbide.

Zinc selenide and zinc sulfide are particularly useful for window substrates because of their broad band (up to 12 to 14 microns) and their ability to remain transparent at temperatures up to 400° F.

Germanium which also has a broad transparency band (up to 12 microns) becomes opaque at elevated temperatures and therefore is not a substrate of choice for applications which would involve elevated temperatures. However, germanium is still an agent of choice for coatings if used as a relatively thin coating as, for instance, less than 50 microns. In a thickness of less than 50 microns, a germanium coating remains transparent at temperatures of up to 400° F.

Also useful for high temperature coatings is gallium arsenide. Gallium arsenide also has a very broad band (up to 16 microns) in the long infrared. Gallium arsenide is also useful as a high temperature substrate, hoWever, because at the present time large windows of gallium arsenide are not available, if gallium arsenide is used as a substrate, generally the window size will be limited with respect to its cross sectional area to the sizes of gallium arsenide substrates which are presently available.

As opposed to gallium arsenide, zinc selenide and zinc sulfide windows are available in large sizes as, for instance, one inch thick with lateral dimensions greater than 12 inches. Thus, these substrates are particularly useful in those instances wherein large windows are desired especially those which would be exposed to high temperatures.

Aluminum oxide, i.e. sapphire; spinel, i.e. $MgAl_2O_4$; and aluminum oxy nitride, i.e. AlON; are useful as materials for mid IR windows. These ceramic substances offer transparency up to about 5 or 6 microns.

Further, these windows offer excellent mechanical consideration as to their strength and size availabilities. These ceramic window substrates also allow for greater variabilities in the shapes of the windows because the powdered precursors of the substrates can be isostatically pressed into desired shapes followed by sintering.

Dopants for the semiconductor coating of the windows of the inventions can be selected as either p type dopants or n type dopants. For germanium or silicon coatings (and semiconducting diamond and silicon carbide), n type dopants are selected from lithium, phorphorus, arsenic, antimony, bismuth and p type dopants are selected from boron, aluminum, gallium, indium, zinc and thallium.

For gallium arsenide or gallium aluminum arsenide coatings, n type dopants are selected from sulfur, selenium, tin, tellurium, germanium, silicon and p type dopants are selected from silicon, germanium, magnesium, lithium, zinc, manganese, cadmium and beryllium. Since silicon and germanium are amphoteric they are useful for both n and p type gallium arsenide dopants.

For zinc sulfide, zinc selenide or zinc oxide coatings, dopants are selected from zinc, aluminum, gallium and indium. In forming coatings of zinc sulfide, zinc selenide or zinc oxide, as an alternate to the addition of a further dopant element, the coating can be doped with zinc by utilizing a less than stoichiometic amount of the respective sulfur, selenium or oxygen during a chemical vapor deposition reaction.

Dopant concentration in the coating takes into consideration material properties and temperatures. The overall sheet resistance of the doped coating is a combination of the sheet thickness and the resistivity. The concentration is selected to achieve the necessary carriers for sheet resistance without detracting from the optical properties of the coating. Generally the lower the dopant concentration the higher the resistivity and the higher the dopant concentration the lower the resistivity.

Temperature is considered for those dopants and coating combinations which may be effected by temperature such as lithium in germanium. Since lithium is a fast diffuser, an appropriate lower temperature environment must be used for both the formation and operation of windows of the invention utilizing lithium doped germanium. Further in using zinc as a dopant in silicon while it is not as temperature dependent as Li/Ge, either device cooling must be provided or a shorter device lifetime expected.

Aside from its optical and electrical properties, selection of an added coating can also consider the mechanical strength and durability of the semiconductor material used. In considering physical durability generally the following order of durability is followed: semiconducting diamond and semiconducting silicon carbide greater than silicon greater than germanium greater than zinc sulfide and zinc selenide and zinc oxide greater than gallium arsenide.

A silicon substrate having a doped silicon coating (formed by either diffusion or as an added layer) provides good mid infrared transparency. It provides the mechanical properties of silicon for both substrate and coating. It is formed from readily availably materials. It provides ease of fabrication and the ability to form various window sizes. Further the silicon coating is readily coated with SiO for further mechanical and anti reflectance considerations.

A doped silicon coating on gallium arsenide provides a mid IR window with the good mechanical properties and fabrication characteristics of the silicon coating. The silicon coating thus increases the abrasion resistance and environmental stability of the gallium arsenide substrate.

If a doped germanium coating is utilized on a germanium substrate the transparency of the window is expanded to include long infrared out to about 12 microns. The doped germanium coating can be prepared by various techniques including lower processing temperatures than is available with a silicon coating.

A doped germanium coating on a silicon substrate while not as broad band as a germanium coating on a germanium substrate is not excluded for high temperature use since the relatively thin (compared to the substrate thickness) of the germanium coating renders the coating transparent at high temperatures.

A doped germanium coating on a gallium arsenide substrate offers the broad band of both the germanium and gallium arsenide coupled with the usefulness of the gallium arsenide substrate at high temperatures.

A doped gallium arsenide or gallium aluminum arsenide coating on gallium arsenide affords a window having an extremely broad transparency band up to 16 microns. While such a window is more fragile than other windows, it is capable of being further coated with other layers for improvements to it mechanical properties.

Generally, substrates of either zinc sulfide or zinc selenide allow the formation of large sized (polycrystalline) windows which are transparent to 14 microns for zinc selenide and 12 microns for zinc sulfide. A doped gallium arsenide or gallium aluminum arsenide coating on such a substrate maintains the broad window of the substrate while maintaining the excellent physical and high temperature properties of the zinc based substrate.

A doped germanium coating on a zinc sulfide or zinc selenide substrate maintains the broad transparency of the zinc based substrate while offering conductive properties of a germanium coating. Thus these windows are available in large sizes and can be prepared by various techniques.

A doped silicon coating on a zinc sulfide or zinc selenide substrate offers variety of fabrication with readily available materials and even great abrasion resistance compared to germanium; however, compared to a germanium or gallium arsenide coating the window is restricted to operation in the near to mid IR.

A doped zinc sulfide, zinc selenide or zinc oxide coating on a zinc sulfide or zinc selenide substrate offers the high temperature use, transmission, durability and availability of a zinc based system for both the coating and substrate and thermal matching resulting from utilizing a zinc based system for both coating and substrate. Depending on the particular zinc compound utilized for either the coating or substrate, transmission out to 12 to 14 microns is possible.

In addition to mechanical stability and thermal insensitivity, a semiconducting diamond or semiconducting silicon carbide coating on a zinc sulfide or zinc selenide substrate offers enhanced abrasion, robustness and durability.

Substituting either a sapphire, spinel or aluminum oxy nitride substrate for the above zinc sulfide or zinc selenide substrates not only retains the mechanical and thermal properties of the windows but enhances them with respect to certain mechanical strengths, methods of fabrication (as, for instance, the above referenced isostatic pressing and sintering to obtain various shapes) and thermal conductivity. This is compromised however in a reduction of the breadth of the tranparency of the window. These ceramic substrate based windows are however transparent out to about 5 or 6 microns, thus they are excellent windows for the mid IR.

A doped semiconducting diamond or semiconducting silicon carbide coating on a sapphire substrate results in the superior mechanical properties of both the coating and the substrate. An exotic shaped substrate coated as for instance with doped semiconducting diamond in a microwave plasma assisted chemical vapor deposition reactor yields a conductive window which mimics the shape of the substrate and has all of the desirable properties of both the coating and the substrate.

In view of the above, a first preferred window of the invention includes a gallium arsenide substrate having a doped gallium arsenide coating thereon.

A further preferred window of the invention includes a gallium arsenide substrate having a doped gallium aluminum arsenide, silicon or germanium coating thereon.

A further preferred window of the invention includes a silicon or germanium substrate which has doped coating formed therein by diffusion.

A further preferred window of the invention includes a silicon or germanium substrate having an added doped gallium arsenide, gallium aluminum arsenide, silicon, germanium, zinc sulfide, zinc selenide or zinc oxide coating thereon.

A further preferred window of the invention includes a zinc sulfide or zinc selenide substrate having a silicon, germanium, gallium arsenide, gallium aluminum arsenide, zinc sulfide, zinc selenide or zinc oxide coating thereon.

A further preferred window of the invention includes a sapphire, spinel or aluminum oxy nitride substrate having a silicon, germanium, gallium arsenide, gallium aluminum arsenide, zinc sulfide, zinc selenide or zinc oxide coating thereon.

A further preferred window of the invention includes a silicon, germanium, gallium arsenide, zinc sulfide, zinc selenide, sapphire, spinel or aluminum oxy nitride substrate having a doped semiconducting diamond or semiconducting silicon carbide coating thereon.

Typically, doped silicon or doped germanium coating will be formed on their appropriate substrates utilizing sputtering, vacuum evaporation or chemical vapor deposition. Typically doped gallium arsenide or gallium aluminum arsenide coating will be formed on their appropriate substrates utilizing metal organic chemical vapor deposition. Typically doped zinc sulfide, zinc selenide and zinc oxide coating will be formed on their appropriate substrates utilizing vacuum evaporation or rf reactive magnetron sputtering. And as noted above, diamond coatings can be formed by microwave plasma assisted chemical vapor deposition.

Referring now to FIG. 1, first and second illustrative windows of the invention are schematically illustrated. The first window employs a semiconductor substrate 11 of silicon while in the second window the substrate is of germanium. The thickness of the substrate is not critical but should be sufficient to make for a structurally self supporting unit and may typically be of the order of 0.015–0.250 inches. Thicker substrates, e.g. 0.5 to 1.0 inches:, could also be employed especially with ZnSe or ZnS substrates. Thicker substrates would be particularly useful when a self supporting unit is called for in view of the fact that adherents presently available which could be used to attach the substrate to a supporting optical window do not have good optical transmittance in the infrared spectrum. With the discovery of adherents with the proper optical characteristics, a supporting window might be employed.

A doped semiconductor layer 14 which may be doped by phosphorous, arsenic or antimony for either substrate is vacuum deposited or carried to the surface of the substrate in an inert gaseous or liquid medium. It is diffused into the substrate to a considerably greater depth than in the prior art. The doped layer is diffused to depths between 15 and 50 microns and in the preferred embodiments is of the order of 25 microns thick. The dopant can be of either a p or a n type and leaves the optical constants of the substrate substantially unaltered when compared with undoped material.

Layered over doped layer 14 are a plurality of dielectric layers 15–18 which are typically thermally evaporated on by techniques well known in the art to form an anti-reflection stack. These layers are typically of a material such as germanium or zinc sulfide and have thicknesses of the order of 0.3 microns. Similar dielectric anti-reflection layers 19–22 are deposited on the bottom surface of substrate 11. The materials employed for these anti-reflection layers and the thicknesses of the deposition thereof are chosen for optimum anti-reflection characteristics for each particular embodiment.

Figure 3:
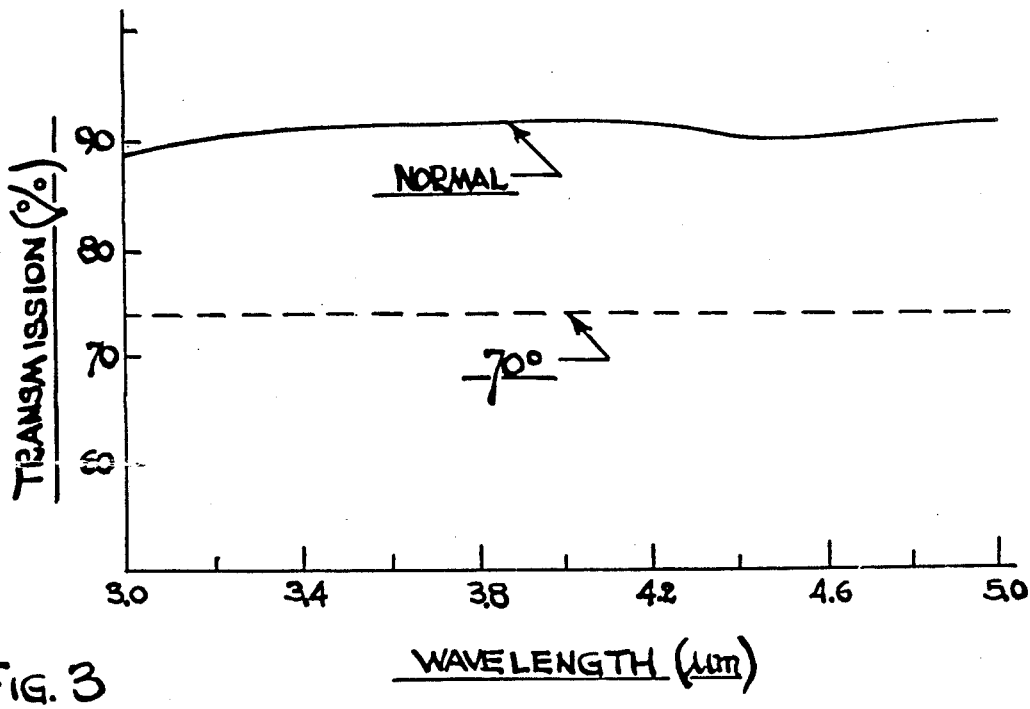
FIG. 3 is a graph illustrating the transmission characteristics of a further window of FIG. 1.

The characteristics of a window of the invention having a germanium substrate are shown in FIG. 3. This window has a sheet resistivity of 5 ohms/square. As can be seen from the graph, between 85% and 95% transmittance is provided in the infrared spectrum between three and twelve microns for light with a normal angle of incidence. With a 70 degree angle of incidence over this same range transmittance varies between about 55% and 78%.

Figure 2:
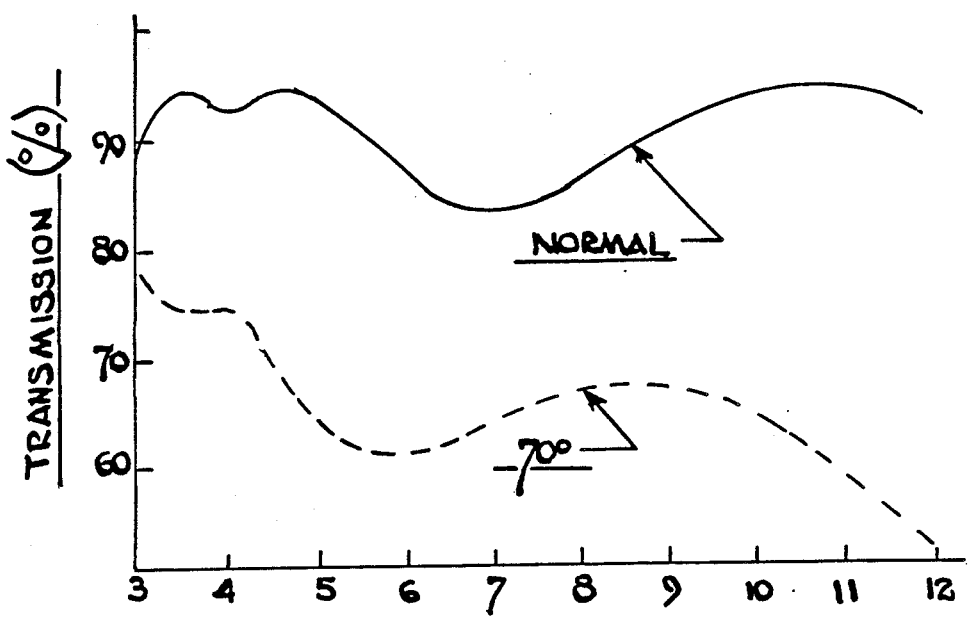
FIG. 2 is a graph illustrating the transmission characteristics of a window of FIG. 1.

Referring now to FIG. 2, the characteristics of a window of the invention with a silicon substrate is shown. For this window, sheet resistance is 5 ohms/square and as can be seen from the figure, transmittance is 90% for light waves between 3 and 5 microns having a normal angle of incidence. As further shown, for an angle of incidence of 70 degrees over the same wave length band, transmittance is about 75%.

Figure 4:
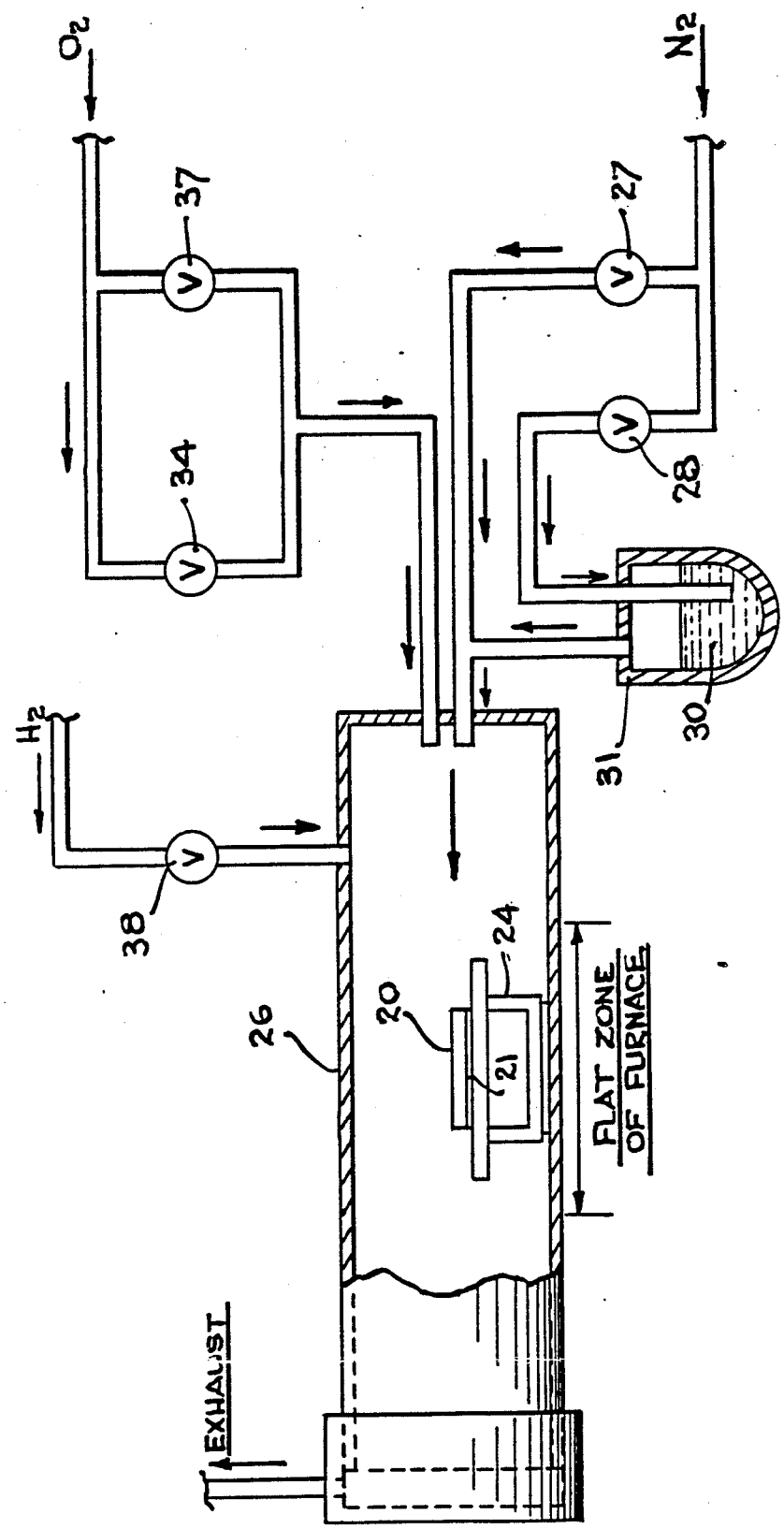
FIG. 4 is a schematic drawing illustrating the fabrication of a window of the invention.

Referring now to FIG. 4, equipment utilized to fabricate a window of the invention with a silicon substrate is shown. The window is fabricated as follows with reference to FIG. 4.

EXAMPLE I

A silicon substrate 20 having a thickness of 0.250 inches has its bottom surface coated with a silicon dioxide coating 21 to a thickness of 1 micron. The silicon dioxide coating is used to provide a barrier layer impervious to the dopant species thus protecting the bottom surface from contact therewith. This silicon dioxide layer can be deposited by any conventional techniques such as sputtering, evaporation or spin coating by conventional techniques well known in the art and is done prior to the placement of the substrate in the furnace 26. Also, in order to remove any residual native oxide from the silicon surface to be doped, after the silicon dioxide layer has been deposited, the substrate is dipped in cold dilute hydrofluoric acid, 10% by volume, for about thirty seconds and then rinsed in deionized water and blown dry with nitrogen immediately prior to insertion in the furnace. This last mentioned step is necessary to prevent any residual oxide on the silicon surface from acting as a barrier to the diffusion of the phosphorous to be used as a dopant. This light etching will not remove an appreciable amount of the silicon dioxide deposited on the lower surface of the substrate. Prior to the insertion of the substrate in the furnace, the furnace temperature is set at 950° C. with valve 27 open and the remaining valves closed to permit the flow of nitrogen gas into the furnace at a rate of 2000 cc/min. The substrate 20 is then placed on quartz boat 24 which is mounted in the flat zone of the quartz lined furnace 26. The flow of nitrogen at 2000 cc/min. through valve 27 into the furnace is continued for a period of five minutes to permit thermal equilibration of the substrate 20 while purging the substrate surface.

When the temperature of the substrate 20 has equilibrated at 950° C., valve 28 is opened (valve 27 is left open) and nitrogen is flowed at a rate of 40 cc/min. through liquid phosphorous oxychloride 30 contained within bubbler flask 31 for a period of 5 minutes to effectively purge the bubbler system. After the bubbler system has been purged by the nitrogen, valve 34 is opened and oxygen flowed into furnace 26 at a rate of 60 cc/min. Valve 28 is left open to effect the feeding of evaporated phosphorous oxychloride into furnace 26 on a nitrogen carrier. The oxygen reacts with the phosphorous oxychloride vapor fed into the furnace from flask 31 to form a phosphate glass on the surface of substrate 20. This deposition process is continued for a period of twenty minutes. At the end of this period, valves 28 and 34 are closed and valve 27 is opened to permit the flow of nitrogen into the furnace for five minutes to purge the furnace.

At the end of this five minute period, valve 27 is closed and the doped substrate removed from the furnace and its surface resistance measured using a four point probe or other convenient device. Typically the resistance so measured is about four times the surface resistance of the doped silicon substrate after the diffusion step. Thus, a silicon surface with phosphate glass measuring 20 ohms/square will yield a silicon surface measuring 5 ohms/square after diffusion has been completed in a following step. If the resistance is too high the silicon substrate is returned to the furnace and the phosphorous oxychloride deposition continued for a period to lower the resistance to the desired point. It is to be noted in this regard that resistance decreases as the concentration of the dopant layer increases.

The furnace is then heated to a temperature of 1150° C. and the doped substrate placed back in the furnace on the quartz boat and valve 27 opened to permit a flow of nitrogen into the furnace at a rate of 1500 cc/min. After sufficient time (five minutes) has elapsed to permit thermal equilibration of the doped substrate, valve 37 is opened to permit a flow of oxygen into the furnace at a rate of 1600 cc/min., with nitrogen continuing to be supplied to the furnace through valve 27 but with the rate of flow reduced to 50 cc/min. Valve 38 is also opened to permit a flow of hydrogen into the furnace at a rate of 2600 cc/min. The flow of oxygen at 1600 cc/min. through valve 37, hydrogen at 2600 cc/min. through valve 38 and nitrogen at 50 cc/min. through valve 27 is continued for thirty minutes to produce a native oxide coating on the dopant surface having a thickness of 5000 Angstroms. At the end of this thirty minute period, valves 37 and 38 are closed to shut off the oxygen and hydrogen supplied to the furnace and valve 27 is adjusted to provide a nitrogen flow to the furnace at the rate of 1500 cc/min., such supply of nitrogen being continued to purge the atmosphere in the furnace, the furnace being kept at its heated temperature for 600 hours to complete the diffusion of the dopant into the substrate. Diffusion time can be varied between 400 and 1000 hours to provide optimum optical transmission and sheet resistance. The substrate can be removed from the oven to check these parameters and diffusion either terminated or continued, as may be called for. After etching in dilute (10% by volume) hydrofluoric acid to remove all residual $SiO_2$ and phosphate glass from either side of the substrate, the antireflectant coatings (15-22) are then deposited by conventional vacuum evaporation from an electron beam source, using monitoring instruments to measure the rate of deposition and the thickness of deposition. In a typical anti-reflectant coating for this example, layers 15 and, 19 consist of germanium and are 0.073 microns thick; layers 16 and 20 consist of aluminum oxide ($Al_2O_3$) and are 0.188 microns thick; layers 17 and 20 are germanium, 0.088 microns thick, and layers 18 and 22 are aluminum oxide ($Al_2O_3$), 0.750 microns thick.

In diffusion fabrication of a window of the invention having a germanium substrate, an n type dopant such as antimony, arsenic, or phosphorous is deposited upon the surface of a substrate by vacuum evaporation or sputtering. The desired dopant in elemental or nonoxide compound form (e.g. antimony) is first vacuum deposited on the germanium surface to a thickness of five Angstroms. The dopant layer is then covered bY a protective coating of a material such as silicon or silicon monoxide to a minimum thickness of 500 to 1000 Angstroms in a vacuum environment. The doped substrate is then placed in a standard electrically heated diffusion furnace employing a flowing reducing gas mixture of nitrogen or argon and hydrogen (3.5% hydrogen by volume), the furnace being sealed at both ends to exclude the ambient atmosphere as is commonly done in chemical vapor deposition processes. The gas mix passes through a bubbler filled with a low vapor pressure oil at the tube exit to prevent back streaming of the ambient atmosphere. The doped substrate is then diffused for fifteen to twenty hours in the furnace at a temperature of 750° C. in an atmosphere of a mixture of nitrogen or argon and 3.5% hydrogen by volume.

The electrical and optical characteristics of the finished product are determined by the details of processing, e.g., the amount of dopant deposited, the diffusion temperature, and the diffusion time. For example, with antimony dopant deposited on a germanium wafer to a thickness of five Angstroms which is covered by a protective coating of elemental silicon 500 Angstroms thick and with the antimony being diffused for twenty hours at 750° C. in an atmosphere of argon having 3.5% hydrogen by volume, an end product is produced having a surface resistance of 4 ohms/square and a transmissivity of 40% in ,the 8-12 micron band and 42% in the 3-5 micron band. On the other hand with antimony deposited on a germanium wafer to a thickness of 200 Angstroms with identical processing as for the first example, an end product having a surface resistance of 1.5 ohms/square and transmissivity of 30% in the 8-12 micron band is provided.

An example of a method for fabricating a window of the invention utilizing a germanium substrate is described in connection with FIG. 5.

EXAMPLE II

A germanium substrate is used having a thickness of 0.250 inches. An antimony dopant layer of 5 Angstroms thickness is then deposited by sputtering. Over the antimony dopant layer a silicon monoxide or elemental silicon protective encapsulant layer is deposited by sputtering to a thickness of 500 to 1000 Angstroms. Referring now to FIG. 5, the substrate 51 is then placed in quartz line furnace 52 which has electrical resistance or inductive heating elements 54. The substrate is supported on a fused quartz boat 56 with the furnace being heated to 400° C. The atmosphere inside the furnace is then purged by feeding nitrogen into the furnace through inlet 52a at 3 liters/minute for a period of thirty minutes. The gas is exited into bubbler 57 wherein to prevent back streaming of the ambient air it is passed to the ambient atmosphere through a low vapor pressure oil, such as diffusion pump fluid. The temperature of the furnace is then raised from 400° C. to 750° C. over a period of thirty minutes, and during this time a gas mixture of nitrogen and 3.5% hydrogen is fed into the furnace at a rate of 1.5 liters/minute. The temperature of the oven is maintained at 750° C. while continuing to feed the nitrogen/hydrogen mixture into the furnace to achieve drive in diffusion of the antimony dopant layer into the germanium substrate. This step is carried on for a period of 16 hours. The furnace is then cooled down from 750° C. to 400° C. over a period of four hours while continuing to feed the nitrogen/hydrogen mixture thereto. With the oven at 400° C., the atmosphere in the furnace is purged by feeding nitrogen at a rate of 1.5 liters/minute for a period of thirty minutes. It is to be noted that in both this and the preceding gas purge steps, that argon can be used in place of nitrogen.

The doped germanium substrate is then removed from the furnace and residual dopant and protective encapsulant material removed from its surface by wet chemical etching, this end result being achieved with a solution composed of ten to fifty percent concentrated hydrofluoric acid, by volume, balance deionized water or with a commerically available mix of 10% HF, balance $NH_4F$, known as "buffered oxide etchant". The substrate is dipped in this mixture at room temperature and gently agitated until all coating residue is removed from the surface as indicated by visual observation. Following this acid dip, the substrate is rinsed in deionized water and blown dry with dry nitrogen gas. Its electrical sheet resistance is then measured using the four-point probe technique, which is well known in the art, and its infrared optical transmission is verified with an infrared spectrophotometer covering the appropriate wavelength region.

Both the doped and undoped surfaces of the substrate are then coated with a plurality of anti-reflection coatings 15-22 (See FIG. 1). These anti-reflection coatings are deposited by vacuum evaporation from an electron beam gun source with appropriate optical and acoustical thickness and deposition rate monitoring instrumentation which is also well known in the art. Only three layers per surface are employed in this window. Layers 15 and 19 consist of thorium tetrafluoride (ThF4) and are 0.621 microns thick; layers 16 and 20 consist of germanium and are 0.098 microns thick; layers 17 and 21 are thorium tetrafluoride (ThF4), 0.621 microns thick.

Figure 6:
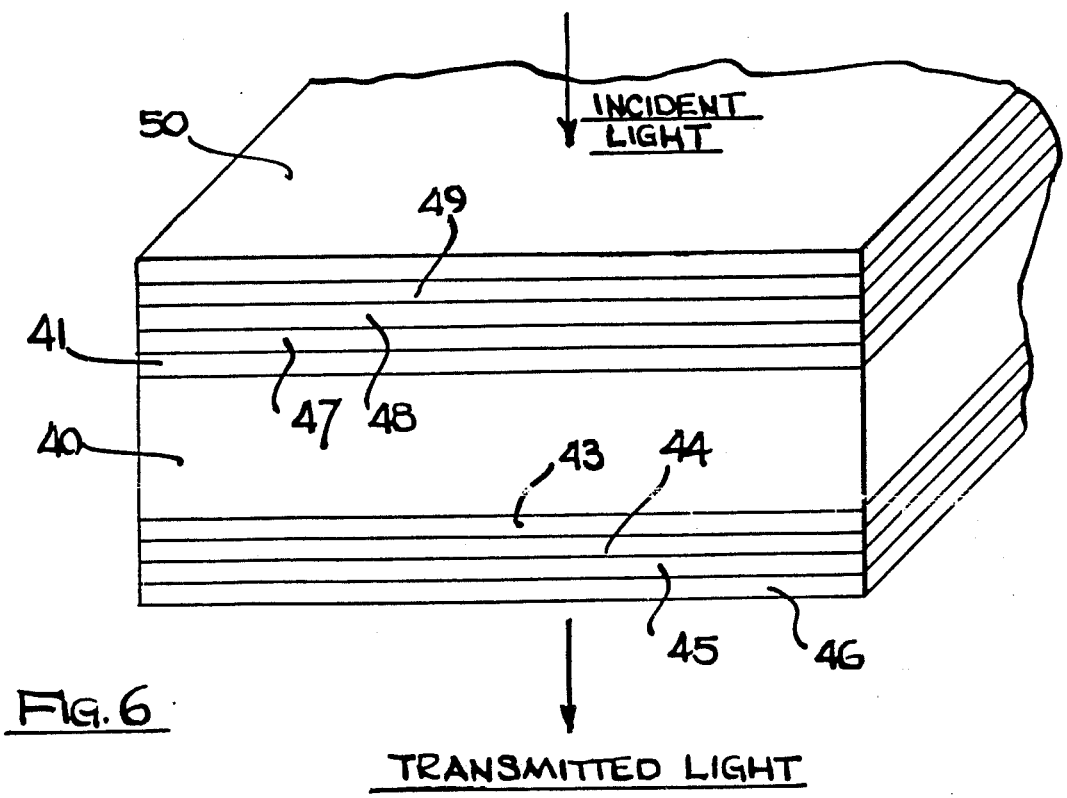
FIG. 6 is a schematic drawings illustrating the structure of a further window of the invention.

Referring now to FIG. 6 a window of the invention employing a gallium arsenide semi-insulating substrate 40 is shown. In this window a gallium arsenide film 41 is grown on the substrate utilizing metal organic chemical vapor deposition (MOCVD). The epitaxial thickness may be 15 to 50 microns, but is typically 25 microns. Epitaxial deposition by this technique is well known in the art and is described for example, on page 324 of *Semiconductor Devices* by S. M. Sze, Published by John Wiley & Sons in 1985. This process in its essence uses sources of trimethylgallium vapor and arsine with hydrogen as a carrier gas. The vapor carried on hydrogen is passed over the gallium arsenide substrate heated in a furnace to 650–900° C. at which temperatures the vapor and gas decompose. The gallium and arsenic thus produced have high affinity for the gallium arsenide substrate and condense on this substrate, forming a crystal surface structure thereon. The thickness of the deposited layer 41 is determined by the amount of gas flowed over the substrate. Since gallium arsenide in its pure state is not electrically conductive at room temperature, an electrically active dopant, silicon in the form of silane is added to the gas stream during the epitaxial growth of layer 41. The silane is added to the gas stream at a very low flow rate such that the resultant silicon is incorporated into the gallium arsenide on the order of silicon atom for $10^6$ gallium arsenide molecules. In this example, the antireflectant coating consists of only three layers per surface. Referring to FIG. 6, layer 41 is epitaxially grown gallium arsenide, layers 43 and 47 consist of zinc selenide and are 0.177 microns thick, layers 44 and 48 consist of silicon monoxide and are 0.224 microns thick, layers 45 and 49 consist of magnesium fluoride and are 0.315 microns thick, and layers 46 and 50 are absent in this design.

An example of the fabrication of a window of the invention employing a gallium arsenide substrate as described is as follows in connection with FIG. 5.

EXAMPLE III

Figure 5:
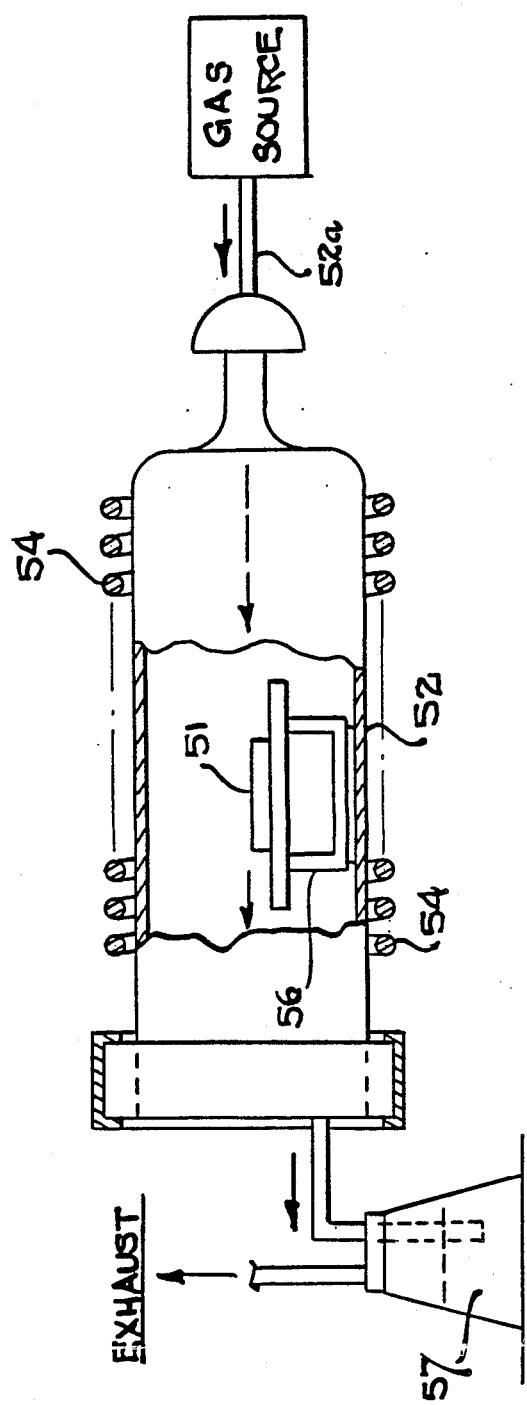
FIG. 5 is a schematic drawing illustrating the fabrication of a further window of the invention.

A gallium arsenide wafer 51 having a thickness of 0.017 inches was placed on a silicon carbide coated susceptor 56 in a quartz reaction chamber such as shown in FIG. 5. This chamber is sealed off from the ambient atmosphere and purged by flowing hydrogen at the rate of 6.5 liters per minute for fifteen minutes. The susceptor 56 for the gallium arsenide substrate is then raised to 800° C. by inductively heating the susceptor (using rf power applied through the coil 54) for a period of fifteen minutes with the addition of arsine being flowed through the chamber at the rate of 0.60 liters/min. The vapors of trimethyl gallium at −12.8° C. on a hydrogen carrier flowing at a rate of 0.080 liters/min. and silane gas diluted with hydrogen at 40 parts silane to one billion parts hydrogen are flowed through the chamber for a period of one hundred minutes to achieve a 24 micron thick epitaxial layer of gallium arsenide. At the end of this period, the flow of trimethyl gallium vapor and silane on the hydrogen carrier is terminated, the flow of arsine being continued. The furnace is then permitted to cool to room temperature, the flow of arsine being shut off when the temperature reaches 550° C.

The anti-reflectant layers are then applied as for the previous window by conventional vacuum evaporation. In this example, the anti-reflectant coating consists of only three layers per surface. Referring to FIG. 6, layer 41 is epitaxially grown gallium arsenide, layers 43 and 47 consist of zinc selenide and are 0.177 microns thick, layers 45 and 49 consist of magnesium fluoride and are 0.315 microns thick, and layers 46 and 50 are not employed in this design.

Further gallium arsenide and gallium aluminum arsenide coating are formed as follows:

EXAMPLE IV

A gallium arsenide substrate polished on both sides was located into an MOCVD reactor (a modified Crystal Specialties Model 410A). A gallium arsenide layer was epitaxially grown thereon to a thickness of about 5 microns. During growth of this layer it was doped with silicon at about $1.5 \times 10^{16} \text{cm}^3$ to form an n gallium arsenide conductive layer.

EXAMPLE V

The same technique can be used to grow a gallium aluminum arsenide layer. Thus a gallium arsenide wafer was inserted into the MOCVD reactor and annealed at 920° C. for 5 minutes immediately followed by the growth of a gallium aluminum arsenide layer to a thickness of about 15 microns. The initial 500 Angstroms of this layer was graded in aluminum content from 0.0 to 0.30 aluminum content. This layer was also doped with silicon ions to a dopant concentration of $1 \times 10^{18} \text{cm}^3$ to form an n gallium aluminum arsenide conducting layer.

Germanium films as coating on substrates can be fabricated using vacuum evaporation, sputtering, and chemical vapor deposition, with electrical and optical properties tailored to suit various applications. Carrier mobilities reported in the literature range from 350 to 1035 cm$^2$/V sec for evaporated films, and from 25 to 1930 cm$^2$/V sec for sputtered films. As a general rule, the germanium films having the highest mobilities are monocrystalline with a relatively low density of microstructural defects, as fabricated by either deposition method. Amorphous films produced by sputtering or evaporation, with or without hydrogenation, typically exhibit electrical conductivities which are too low by several orders of magnitude for windows of the invention.

Both vacuum evaporation and sputtering methods of coating fabrication may be described in terms of three steps: (1) Transition from a condensed (solid or liquid) phase to the vapor or plasma phase; (2) Transport of the vapor or plasma phase from the source to the substrate; (3) Condensation of the vapor or plasma on the substrate followed by film nucleation and growth.

In vacuum evaporation, vapors are produced by heating a source by direct resistance, radiation, eddy currents (induction), electron beam, laser beam, or an arc discharge. The process is carried out in high vacuum ($10^{-5}$ to $10^{-6}$ Torr) so that the evaporated atoms travel in an essentially collisionless, line-of-sight path to condense on the substrate, which is usually at ground potential (i.e., not electrically biased).

In sputter (ion beam and conventional) coating processes, a source of coating material, i.e. a target, is bombarded by ions of a heavy inert gas (e.g., Argon) at pressures from $10^{-4}$ to 0.2 torr, ejecting material in atomic or molecular form due to the momentum exchange associated with ions impacting the solid surface. The flux of sputtered atoms is intercepted by the substrate in the vacuum chamber. The substrate may be heated, cooled, electrically biased, or grounded. Higher energy of the sputtered atoms leads to improved bonding with the substrate, but also to higher residual stress in the sputtered coating.

Deposition conditions required to fabricate high quality germanium films generally include elevated substrate temperatures as, for example, 150 to 700° C. for evaporation and 150 to 400° C. for sputtering. Further stringently clean high vacuum conditions are practiced as is the highly successful use of substrate bias.

The structure and properties of sputtered and evaporated germanium is known to depend upon deposition rate, substrate temperature, ambient pressure in the coating system, and substrate electrical potential (bias), if any. Several models have been presented in the literature, attempting to explain the experimental observations and deduce quantitative relationships with deposition variables. More or less quantitative relationships between film growth rates, substrate temperatures, and film crystallinity have been obtained by several observers. While these differ in detail, there is broad agreement as to minimum temperatures for homoepitaxy (150-180° C.) and the activation energy for the amorphous to crystalline transition (approximately 1.5 eV in accord with nucleation theory and the observed activation energy for surface diffusion of germanium on germanium). Data relating to Hall mobilities of germanium films to substrate temperature during deposition have also been reported.

For sputtering germanium films having high electrical conductivity and carrier mobility and acceptable optical transmission, a substrate which can be both heated and electrically biased is utilized. Typical RF sputtering conditions include target bias 3000 V, substrate bias 600 V and substrate temperature 360° C. The sputtering is performed with 60 Hz ac power supplied to both target and substrate holder in a vacuum system with a base pressure of $10^{-6}$ Torr.

An additional method utilized an RF (13.6 MHz) diode or magnetron or DC magnetron sputtering source (Cathode) of germanium and a substrate table with capability for both heating and application of an RF bias potential. The system is pumped with a diffusion pump and liquid nitrogen (N$_2$) trap to a base pressure of about $10^{-7}$ Torr. Cryo- or turbo-molecular pumping to a lower base pressure are preferable, given the importance of reducing the levels of contaminants such as oxygen and water vapor. An ion gun capable of direct bombardment of the substrate and growing film may be considered as an alternative to substrate biasing to achieve the same end; supplying sufficient energy to the atoms of the growing film to promote the development of long range order (crystallization) at low to moderate substrate temperatures. An further alternative approach employs ion beam sputtering of a germanium target as a substitute for the RF or DC magnetron sources suggested above, in combination with ion bombardment of the heated substrate by a second ion gun.

For reasons of optical transmission, durability, and availability in large sizes, polycrystalline zinc sulfide and zinc selenide are preferred substrate materials for these germanium coatings (as well as other coatings utilized in high temperature windows). In addition, an antireflection coating can be used between the substrate surface and the conductive germanium layer.

A different approach utilizes plasma-enhanced chemical vapor deposition (PECVD). This technique exhibited success in the fabrication of high quality silicon and germanium films at substrate temperatures of of less than 300° C.

EXAMPLE VI

A further doped germanium coating was fabricated on a zinc selenide substrate utilizing ion pumped e-beam evaporation. Germanium (high purity 40 ohm/cm), dopant antimony (99.9999%) and zinc selenide substrates were cleaned in a heated solvent followed by an acid dip. They were loaded in the vacuum chamber of the e-beam system. The chamber was pumped down to $10^{-8}$-$10^{-7}$ torr while the substrate, shuttered from the sources, was heated at 300° C. The substrate was further heated to 400° C. and just prior to evaporation the antimony was heated to 550° C. The e-beam control was activated and the germanium source heated to achieve an evaporation rate of 3 angstroms per second. The shutter between the sources and the zinc selenide substrate was removed to initiate deposition on the substrate. Evaporation was continued for a time sufficient to achieve a desired thickness of the coating on the substrate. Upon completion of the coating, the e-beam heat, the antimony heat and the substrate heat were discontinued and the reactor cooled for about 2 hours to 100° C. After the cooling period vacuum was disrupted and the coated substrate removed from the vacuum chamber. Utilizing this procedure windows having coatings of thickness from 2 microns to 25 microns can be formed.

EXAMPLE VII

In a like manner to example VI, a window having a antimony doped germanium coating on a gallium arsenide substrate is prepared.

While the invention has been described and illustrated in detail, it is to be clearly understood that this is by way of illustration and example only and is not to be taken by way of limitation, the spirit and scope of the invention being limited only by the terms of the following claims.

What is claimed is:

1. A conductive window transparent to infrared radiation comprising
   a substrate made of material selected from the group consisting of zinc sulfide and zinc selenide and formed in a manner to be transparent to infrared radiation,
   a thin coating of semiconductor material deposited on the surface of said substrate in a manner to be transparent to infrared radiation,
   a dopant contained in said semiconductor coating,
   said dopant being selected to thereby form with said coating a semiconductor having significant carrier concentration of donors or acceptors,
   said dopant thereby causing said coating to exhibit conductivity with a sheet resistance of less than about 30 ohms per square, and
   the thickness of the semiconductor coating and the concentration of the dopant being adjusted to cause said coating to remain substantially transparent while exhibiting said conductivity.

2. A transparent, conductive window of claim 1 wherein:
   said semiconductor coating is selected from the group consisting of gallium arsenide, silicon, germanium, zinc sulfide, zinc selenide, zinc oxide, semiconducting diamond and semiconducting silicon carbide.

3. A transparent, conductive window of claim 1 wherein:

said semiconductor coating is of a thickness of about 2 microns to about 25 microns.

4. A transparent, conductive window of claim 1 wherein:
said window is transparent to electromagnetic radiation of wavelengths selected from the range of from about 0.4 microns to about 12 microns.

5. A transparent, conductive window of claim 1 wherein:
said window is transparent to electromagnetic radiation of wavelengths selected from the range of about 2 microns to about 12 microns.

6. A transparent, conductive window of claim 1 wherein the sheet resistance of said semiconductor coating is less than about 10 ohms per square.

7. A transparent, conductive window of claim 1 wherein:
said semiconductor coating and said substrate of the same material or of a different material with the proviso that when said substrate is a semiconductor material said resistivity of said semiconductor substrate is greater than 10 ohms per square.

8. An infrared, transparent, conductive window comprising
an infrared, transparent substrate selected from the group consisting of zinc sulfide and zinc selenide,
an infrared, transparent semiconductor coating deposited on a surface of said substrate,
said semiconductor coating is selected from the group consisting of germanium and silicon,
a dopant in said semiconductor coating for rendering said semiconductor coating conductive, and
said dopant being selected from the group consisting of lithium, phosphorus, arsenic, antimony, bismuth, boron, aluminum, gallium, indium, zinc and thallium.

9. An infrared, transparent, conductive window comprising:
an infrared, transparent substrate selected from the group consisting of zinc sulfide and zinc selenide,
an infrared, transparent semiconductor coating of gallium arsenide deposited on a surface of said substrate,
a dopant in said semiconductor coating for rendering said semiconductor coating conductive, and
said dopant being selected from the group consisting of sulfur, selenium, tin, tellurium, germanium, silicon, magnesium, lithium, zinc, manganese, cadmium and beryllium.

10. A conductive window transparent to infrared radiation comprising
a substrate made of material selected from the group consisting of zinc sulfide, zinc selenide, sapphire, spinel and aluminum oxy nitride,
said substrate being made to be transparent to infrared radiation,
a thin coating of semiconductor material deposited on the surface of said substrate in a manner to be transparent to infrared radiation,
a dopant contained in said semiconductor coating
said dopant being selected to thereby form with said coating a semiconductor having significant carrier concentration of donors or acceptors,
said dopant thereby causing said coating to exhibit conductivity with a sheet resistance of less than about 30 ohms per square, and
the thickness of the semiconductor coating and the concentration of the dopant being adjusted to cause said coating to remain substantially transparent while exhibiting said conductivity.

11. A conductive window transparent to infrared radiation comprising
a substrate made of material selected from the group consisting of zinc sulfide and zinc selenide and formed in a manner to be transparent to infrared radiation,
a thin coating of semiconductor material deposited on the surface of said substrate in a manner to be transparent to infrared radiation,
said semiconductor coating selected from the group consisting of gallium arsenide, silicon, and germanium,
a dopant contained in said semiconductor coating
said dopant being selected to thereby form with said coating a semiconductor having significant carrier concentration of donors or acceptors,
said dopant thereby causing said coating to exhibit conductivity with a sheet resistance of less than about 30 ohms per square, and
the thickness of the semiconductor coating and the concentration of the dopant being adjusted to cause said coating to remain substantially transparent while exhibiting said conductivity.

* * * * *